United States Patent
Fälth et al.

(10) Patent No.: US 10,158,219 B2
(45) Date of Patent: Dec. 18, 2018

(54) ELECTRIC FIELD CONTROL DEVICE FOR HIGH POWER CABLE AND METHOD FOR MANUFACTURING THEREOF

(71) Applicant: ABB HV CABLES (SWITZERLAND) GMBH, Baden, Aargau (CH)

(72) Inventors: Fredrik Fälth, Karlskrona (SE); Markus Saltzer, Karlskrona (SE); Santhosh Bvmp, Hyderabad (IN); Hossein Ghorbani, Malmö (SE)

(73) Assignee: ABB HV CABLES (SWITZERLAND) GMBH, Baden, Aargau (CH)

( * ) Notice: Subject to any disclaimer, the term of this patent is extended or adjusted under 35 U.S.C. 154(b) by 0 days.

(21) Appl. No.: 15/310,168

(22) PCT Filed: Aug. 22, 2014

(86) PCT No.: PCT/EP2014/067930
§ 371 (c)(1),
(2) Date: Nov. 10, 2016

(87) PCT Pub. No.: WO2016/026538
PCT Pub. Date: Feb. 25, 2016

(65) Prior Publication Data
US 2017/0244235 A1     Aug. 24, 2017

(51) Int. Cl.
*H01B 19/04* (2006.01)
*H01B 7/18* (2006.01)
(Continued)

(52) U.S. Cl.
CPC ............. *H02G 15/068* (2013.01); *H01B 7/18* (2013.01); *H01B 7/28* (2013.01); *H01B 19/04* (2013.01); *H02G 1/145* (2013.01); *H02G 1/14* (2013.01)

(58) Field of Classification Search
CPC ....... C08G 73/0266; C08L 79/02; H01B 1/24; H01B 1/128; H01B 7/18; H01B 7/28;
(Continued)

(56) References Cited

U.S. PATENT DOCUMENTS 3,823,255 A * 7/1974 La Gase ................ H01B 7/295
174/113 R
4,159,860 A * 7/1979 Broad .................. H02G 15/064
174/73.1
(Continued)

FOREIGN PATENT DOCUMENTS

| CN | 1874096 A | 12/2006 |
|---|---|---|
| CN | 102436877 A | 5/2012 |

(Continued)

OTHER PUBLICATIONS

Chinese Office Action for Chinese Application No. 201480079045.0, dated Sep. 14, 2017, with English translation.
(Continued)

*Primary Examiner* — Timothy Thompson
*Assistant Examiner* — Guillermo Egoavil
(74) *Attorney, Agent, or Firm* — Birch, Stewart, Kolasch & Birch, LLP

(57) ABSTRACT

An electric field control device for a high voltage cable includes a stress cone and a field grading adapter, wherein the stress cone and the field grading adapter are chemically bonded by vulcanization. An electric installation includes a power cable and the electric field control device. A method for producing the electric field control device is also disclosed.

14 Claims, 5 Drawing Sheets

(51) Int. Cl.
*H02G 1/14* (2006.01)
*H02G 15/068* (2006.01)
*H01B 7/28* (2006.01)

(58) Field of Classification Search
CPC ........ H01B 7/0291; H01B 19/04; H01R 9/05; H02G 1/14; H02G 1/145; H02G 15/068; H02G 15/184; H02G 15/188; H02G 15/1806; Y10T 428/2933
USPC ................ 174/73.1, 84 R; 29/868; 428/375; 439/198, 168
See application file for complete search history.

(56) References Cited

U.S. PATENT DOCUMENTS

| | | | |
|---|---|---|---|
| 2004/0127616 A1* | 7/2004 | Wentworth | C08K 5/10 524/284 |
| 2009/0166084 A1 | 7/2009 | Mirebeau et al. | |
| 2010/0139974 A1* | 6/2010 | Christen | H02G 15/1806 174/84 R |
| 2011/0114358 A1 | 5/2011 | Takayasu et al. | |
| 2013/0078836 A1* | 3/2013 | Li | H02G 15/068 439/198 |
| 2013/0093124 A1 | 4/2013 | Andersson | |
| 2014/0065420 A1* | 3/2014 | Sonerud | H01B 1/128 428/375 |
| 2014/0191841 A1* | 7/2014 | Boday | H01C 1/028 338/226 |

FOREIGN PATENT DOCUMENTS

| | | |
|---|---|---|
| CN | 10290955 A | 1/2013 |
| DE | 1 950 325 | 4/1971 |
| DE | 135 264 | 4/1979 |
| EP | 0 491 447 A2 | 6/1992 |
| EP | 2639264 A1 | 9/2013 |
| EP | 2752448 A1 | 7/2014 |
| GB | 1 265 469 | 3/1972 |
| WO | WO 2007/133202 A1 | 11/2007 |
| WO | WO 2009/041013 A1 | 4/2009 |
| WO | WO 2013004748 A2 * | 1/2013 ........... H02G 15/068 |

OTHER PUBLICATIONS

Korean Office Action for Korean Application No. 10-2016-7035231, dated Oct. 31, 2017, with English translation.
Chinese Office Action and English translation for Application No. 201480079045.0, dated Mar. 22, 2018.
European Communication pursuant to Article 94(3) EPC for Application No. 14756031.2, dated Apr. 26, 2018.

* cited by examiner

ELECTRIC FIELD CONTROL DEVICE FOR HIGH POWER CABLE AND METHOD FOR MANUFACTURING THEREOF

TECHNICAL FIELD

The technology disclosed herein relates generally to the field of electric stress relief devices and in particular to an electric field control device for a high voltage cable, to an electric installation and a method of manufacturing the electric field control device.

BACKGROUND

At a termination end of a high power cable the high voltages will create electric fields and electrical stress, in particular at an outer shield of the cable. High voltage cables therefore need to have some type of stress relief device installed at the termination end thereof for handling these electrical stresses.

A stress cone is one type of such stress relief devices for controlling electric fields particularly at cable terminations, and is in many cases crucial for the functioning and robustness of cable terminations. The stress cones are typically made of two different rubber materials, e.g. semiconducting rubber and insulating rubber, where the shape and difference in material properties guide and distribute the electric field in order to minimize risks of insulation breakdown. A deflector, for instance made of semiconducting rubber, guides the electric field through insulating rubber with high breakdown strength.

In existing high power cable terminations, in particular in high voltage direct current (HVDC) terminations, the stress cone is installed over a field grading adapter in turn mounted over the cable end. A resistive field grading adapter comprising a field grading material redistributes the electric field through its field-dependent conductivity, wherein the electrical conductivity depends on the electric field. The stress cone also provides geometrical field grading in order to control the electric field during transients, such as impulses.

SUMMARY

The two separate parts of the stress relief device, i.e. the field grading adapter and the stress cone, installed at the termination of the high voltage cable results in two physical interfaces at which different materials meet. These interfaces may entail shortcomings related for instance to the traditional installation method wherein the field grading adapter is first arranged on the cable end and after which the stress cone is arranged on the field grading adapter. There is a risk of contaminations, e.g. grease and chemicals, being introduced on these parts which may reduce their performance.

The functionality of the stress cone and field grading adapter may further be affected by the presence of voids at the interface being created at the installation. A number of risks have thus been identified and there is a need for improvements in this regards.

An object of the present invention is to solve or at least alleviate at least one of the above mentioned problems.

The object is according to a first aspect achieved by an electric field control device for a high voltage cable. The electric field control device comprises a stress cone and a field grading adapter, wherein the stress cone and the field grading adapter are chemically bonded by vulcanization. The invention provides an electric field control device having an increased operational robustness by having removed a physical interface between the field grading adapter and the stress cone, which could be contaminated during installation. Further, a faster installation is provided as only one body is to be fitted over the power cable end. Further still, the installation is facilitated and made safer in that a single device is to be placed correctly.

In an embodiment, the stress cone comprises a deflector and a rubber part vulcanized together.

In a variation of the above embodiment, the rubber part of the stress cone extends along the length of the field grading adapter, such that the field grading adapter is in contact only with the rubber part of the stress cone. In this embodiment, there is no triple point, i.e. no point at which three different material meet. Risks related to triple points, e.g. dangerously high electric field strength, are thus eliminated.

In an embodiment, the rubber part has essentially the shape of a truncated cone and comprises a circumferential groove at an end thereof opposite a truncated top part of the rubber part, wherein the deflector is arranged along a surface of the circumferential groove. Such groove may be advantageous in some instances, e.g. for providing mechanical support when the electric field control device is being installed.

In an embodiment, the deflector is made of semiconducting rubber and the rubber part is made of insulating rubber.

In an embodiment, the field grading adapter is made of a first field grading material and the rubber part is made of a second field grading material.

In variations of the above embodiment, the first field grading material has different electrical properties than the second field grading material.

The object is according to a second aspect achieved by an electric installation comprising a high power cable comprising an electrical conductor circumferentially surrounded by an insulating layer and conductive shield and comprising an electric field control device according to any of the above embodiments. The electric field control device may be arranged over an edge where the conductive shield is terminated, thus protecting against electric fields created at such location.

The object is according to a third aspect achieved by method for manufacturing an electric field control device for a high voltage cable. The method comprises vulcanizing together a stress cone and a field grading adapter, whereby the stress cone and the field grading adapter are chemically bonded. The method removes the physical interface between the stress cone and the field grading adapter by the vulcanization and thereby reduces the effects of internal defects, such as voids, and contaminants, and thereby also increases the electric breakdown strength of the electric field control device.

In an embodiment, the method comprises, prior to the vulcanizing together the stress cone and the field grading adapter, moulding the stress cone and moulding the field grading adapter.

In an embodiment, the method comprises, prior to the vulcanizing together the stress cone and the field grading adapter, producing the field grading adapter by a taping process comprising wounding a tape made of a field grading material around a cylindrical body.

In an embodiment, the method comprises, prior to the vulcanizing together the stress cone and the field grading adapter, producing the stress cone by a taping process comprising wounding a tape into a body and forming the body into a desired shape of the stress cone.

In an embodiment, the method comprises, wherein the stress cone comprises a deflector and a rubber part, and wherein the method comprises, prior to the vulcanizing together the stress cone and the field grading adapter, vulcanizing together the deflector and the rubber part.

Further features and advantages of the present invention will become clear upon reading the following description and the accompanying drawings.

DETAILED DESCRIPTION

Figure 1:
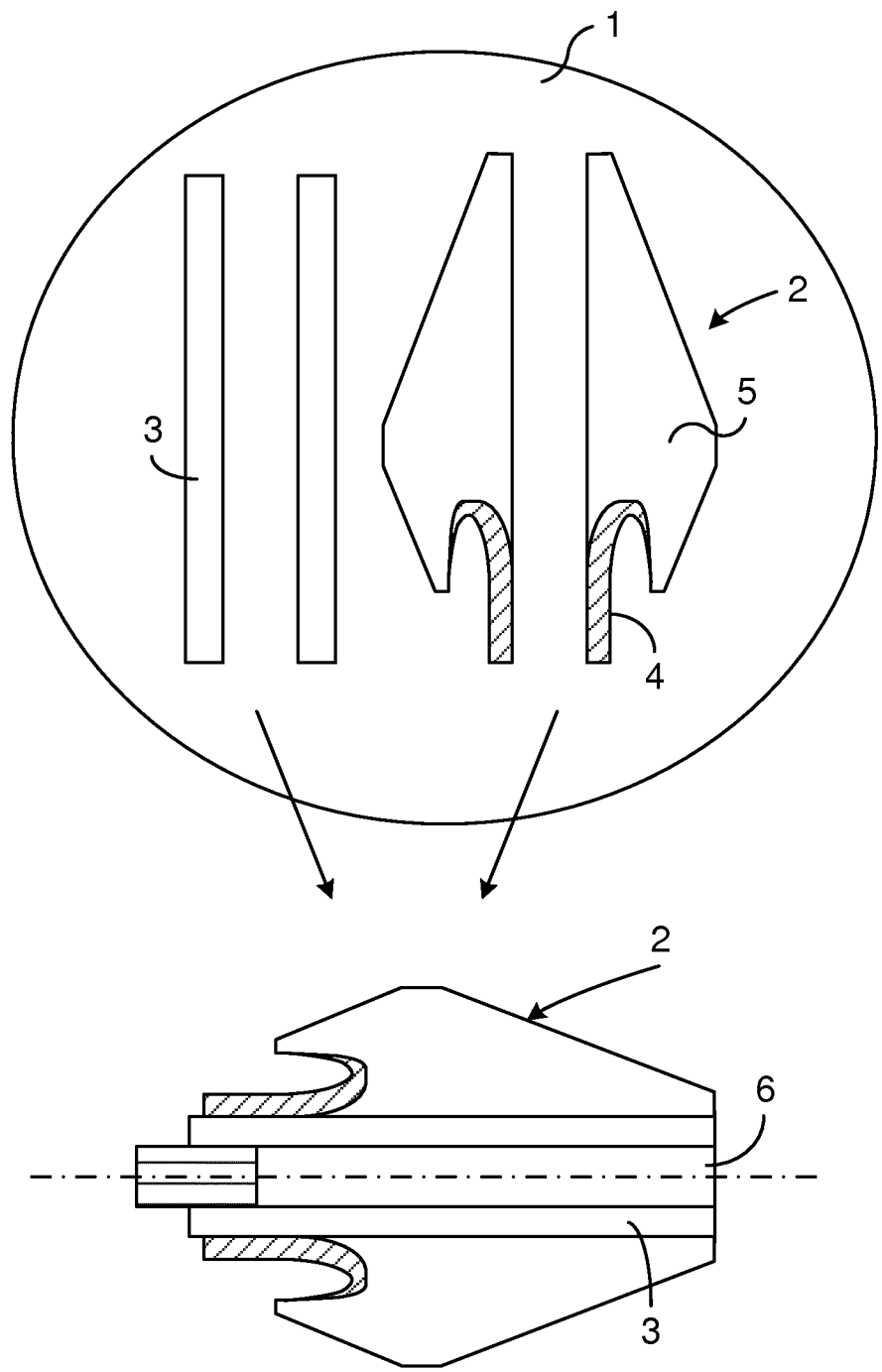
FIG. 1 illustrates a prior art stress relief device.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide a thorough understanding of the present invention, a brief description of a prior art stress cone arrangement is given with reference to FIG. 1 for comparison. The stress cone arrangement 1 comprises a stress cone 2 and a field grading adapter 3. The stress cone 2 and the field grading adapter 3 are shown in cross sectional views at the upper part of FIG. 1. The stress cone 2 typically comprises a deflector 4 made of semiconducting rubber and a cone shaped rubber part 5 made of insulating rubber. The deflector 4 guides the electric field that is created at a cable end through the insulating rubber part 5. The stress cone 2 is thus typically made of two different rubber materials which are vulcanized together.

FIG. 1 also illustrates in a longitudinal sectional view of a cable 6, which typically comprises a central conductor core that is surrounded by different layers. These layers comprise for instance semiconducting and insulating layers, conductive shield(s) and outer jacket.

When the cable 6 is to be connected to e.g. equipment in a substation, is has to be cut and some layers of the cable need to be stripped off, i.e. be removed. The stress cone arrangement 1 is then installed in order to ensure safe operation. At the installation, the field grading adapter 3 is mounted over the cable 6 at the ending thereof so as to cover a surface of the cable 6 from ground to high voltage. The cable 6 is grounded at an outer conductive shield (also denoted outer semicon), and the high voltage is at a connection device of the cable 6. The stress cone 2 is then mounted over, in particular pushed over, the field grading adapter 3, and is thus circumferentially surrounding the field grading adapter 3. This is illustrated in the lowermost part of FIG. 1.

The inventors of the present invention have identified the above procedure to pose risks in view of robustness. As mentioned earlier, the two physical interfaces created at the above described installation may introduce contaminations, voids and grease and lower the breakdown strength of the stress cone arrangement, which in turn may endanger the functioning thereof.

Figure 2:
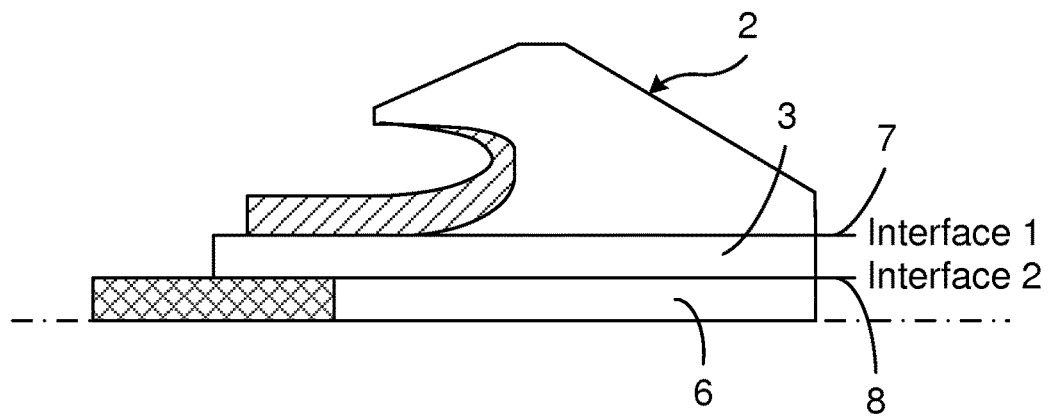
FIG. 2 illustrates shortcomings of the prior art stress relief device.

FIG. 2 illustrates the two interfaces that are created. A first interface 7 is created between the field grading adapter 3 and stress cone 2 and a second interface 8 is created between the field grading adapter 3 and the cable 6.

The risks and shortcomings of prior art is overcome by various embodiments of the present invention. Briefly, by vulcanizing the field grading adapter and the stress cone at manufacturing thereof, and installing them as a single electric field control device, one or more of the mentioned risks are eliminated.

Figure 3:
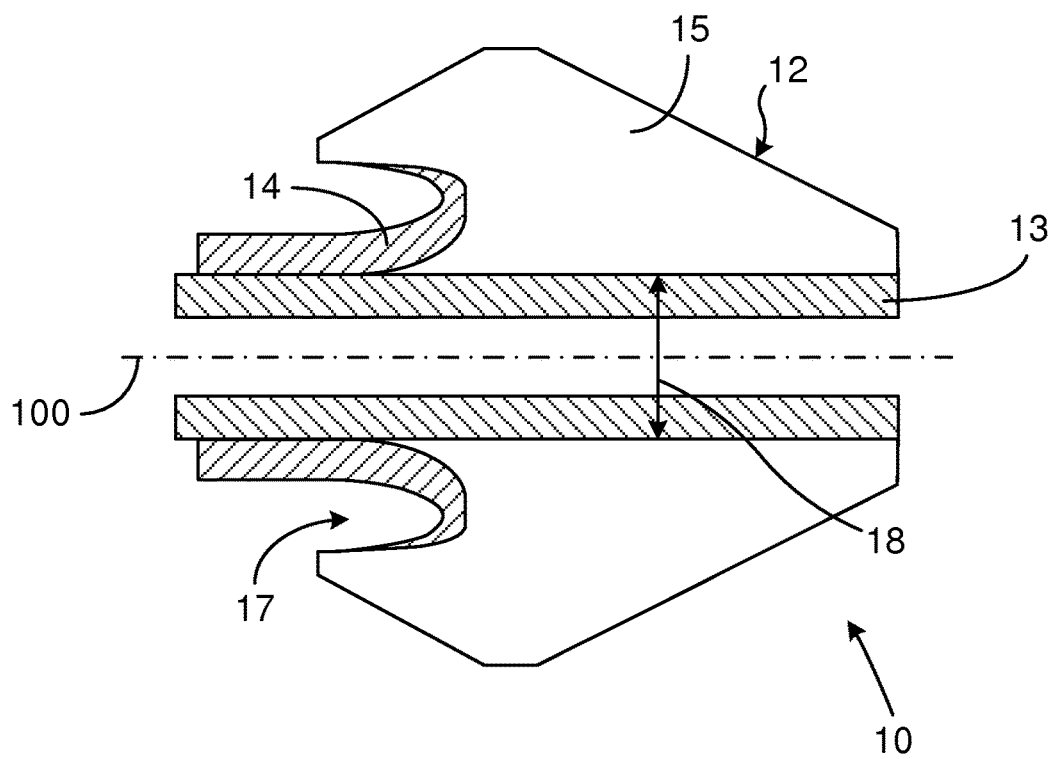
FIG. 3 illustrates an embodiment of an electric field control device according to the present invention.

FIG. 3 illustrates an embodiment of the present invention, in particular an electric field control device 10. The electric field control device 10 comprises a stress cone 12 and a field grading adapter 13 vulcanized together. The electric field control device 10 is shown in a longitudinal sectional view along an axial symmetry line 100.

The stress cone 12 comprises a deflector 14 and a cone shaped rubber part 15, as indicated by reference numeral 12. The deflector 14 may for instance be made of semiconducting rubber, such as carbon black filled Ethylene Propylene Diene Monomer (EPDM) rubber. The rubber part 15 may for instance be made of insulating rubber, for example EPDM rubber or field grading material. The stress cone 12 is thus made of two different rubber materials, having different electrical properties. The rubber part 15 and the deflector 14 are chemically bonded to each other by means of vulcanization. The stress cone 12 has a geometrical shape adapted for controlling electric fields in the area of a cable end, and in particular where the semi-conducting shield of the cable is cut away.

The rubber part 15 may have essentially the shape of a cut-off cone, also denoted truncated cone, comprising of a solid material and having a cylindrical bore 18 through along its longitudinal axis. The field grading adapter 13 is in the figure illustrated arranged within this cylindrical bore 18. The outside diameter of the stress cone 12 thus varies from one end thereof to another along its longitudinal axis. At the second end of the rubber part 15 of the stress cone 12, a circumferential groove 17 is provided. The groove 17 may be advantageous in some instances, e.g. for providing mechanical support when the electric field control device 10 is installed. As a particular example, a support of e.g. metal may be fitted into the groove at installation. The support then assures mechanical stability and correct positioning of the electric field control device. The groove 17 thus ensures that the field-grading provided is the desired one by fixating the stress cone in its correct position, which is important for the functioning. However, it is noted that the groove 17 as such is not a part of the actual field grading system and that it could have other designs or be omitted.

The deflector 14 is arranged circumferentially along the surface of the rubber part 15 following the circumferential groove 17. The deflector 14 may have a first thickness closest to the bore 18 of the stress cone 12, which thickness may, but need not, be reduced along its arrangement along the surface of the rubber part 15 as illustrated in FIG. 3. In the illustrated embodiment, the deflector 14 thus has an essentially circular u-shaped body. It is however noted that the curvature of the deflector 14 towards the insulating rubber part 15 may be differently shaped than illustrated in the figure. Further, the thickness thereof may be constant or it may vary along its extension. It is noted that the adapting of the shape of a stress cone to electric fields is known as such. The deflector 14 and the rubber part 15 are vulcanized together.

The electric field control device to also comprises the field grading adapter 13. The field grading adapter 13 may comprise a tubular body, e.g. a cylinder of a certain length. The field grading adapter 13 may comprise linear or non-linear resistive field grading material (FGM). A non-linear resistive FGM adapts to the changing electric stresses created in the cable termination end. The resistive non-linear FGM may also respond dynamically to voltage impulse shapes by adapting the conductivity in a non-linear way to the electric field stress experienced. The FGM adapter 13 may be adapted in view of the particular application at hand by adapting its thickness and/or by adapting the FGM to have a desired electric conductivity to meet the expected electrical field stresses of the particular application. The FGM may be characterized in different ways. The conductivity of the non-linear FGM depends on the electric field and varies greatly, in particular to a much larger extent than other materials. The FGM has a field-dependent conductivity that may increase strongly from a low conductivity value to a high conductivity value, i.e. changes from being highly insulating (high resistance) to being highly conductive (low resistance). As a particular, non-limiting example the FGM may have a conductivity in the region of $10^{-16}$ or $10^{-14}$ Siemens per meter (S/m) in case of being exposed to a low electric field, and change to have a conductivity in the region of $10^{-3}$ S/m or 0.1 S/m in case of being exposed to a high electric field. The FGM may for example comprise SiC and/or ZnO and/or carbon black filled polymers, and the characteristics of the FGM may be designed to have a certain conductivity. The FGM may also be designed to have a permittivity (also denoted dielectric constant) set in view of obtaining some capacitive field grading, e.g. by choosing filler material and concentration of the chosen filler material accordingly.

In accordance with the present invention, the field grading adapter 13 and the stress cone 12 are vulcanized together, providing an electric field control device 10 comprising a single body. The field grading adapter 13 is arranged along the inner surface of the stress cone 12, i.e. along the surface of the bore 18 thereof. In the embodiment illustrated in FIG. 4, the field grading adapter 13 is in contact with the rubber part 15 as well as with the deflector 14. In another embodiment, illustrated and described with reference to FIG. 5, the field grading adapter 13 is in contact only with the rubber part 15.

In an embodiment, both the field grading adapter 13 and the rubber part 15 are made of FGM material and vulcanized together into a single body. For instance, the rubber part 15 may be made of an FGM material having electrical properties different than the electrical properties of the field grading adapter 13.

The vulcanization process used for vulcanizing together the field grading adapter 13 and the stress cone 12 may for example comprise adding a curative, also denoted cross-linking agent or vulcanizing agents, such as sulfur and use high pressure and high temperature. Other examples of vulcanization processes that can be used comprise hot air vulcanization and ultraviolet (UV) light vulcanization. The curatives used in the vulcanization process may for example comprise the mentioned sulfur, or peroxides. During the vulcanization process, the material is modified in such a way that individual polymer chains are cross-linked (bridged).

The merging together of two rubber materials by vulcanization is a known process to enhance both the mechanical and electrical stability of the interface. By choosing the vulcanization parameters carefully, cross-linking of the polymers will occur between materials. By removing the physical interface, the effect of internal defects, such as voids, contaminants etc., is greatly reduced. Such defects are a major cause of electrical failure, and by removing them, as is done by the present invention, the electric breakdown strength can be greatly increased. Further, the mechanical stability of the materials will increase when they are merged. The vulcanization process increases adhesion between the materials, preventing slipping, and greatly reduces crack propagation along the interface.

Figure 4:
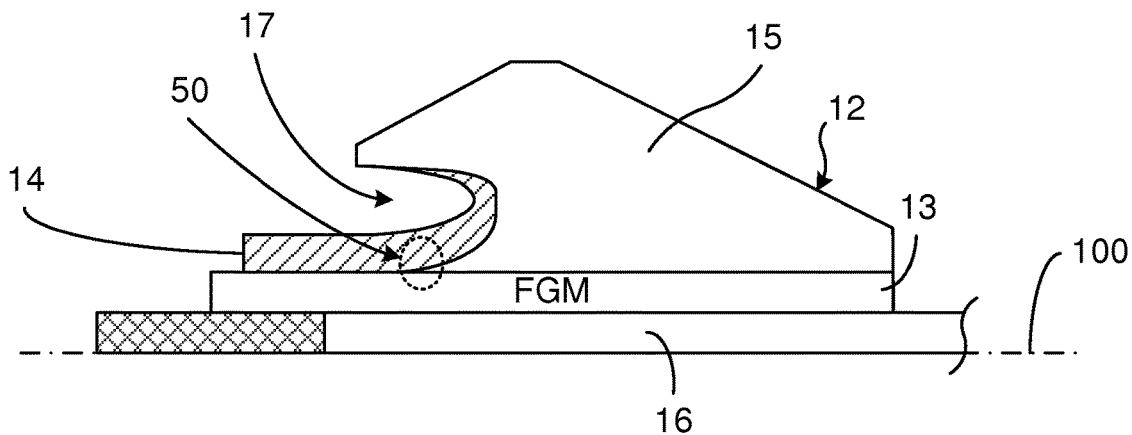
FIG. 4 illustrates an embodiment of an electric field control device according to the present invention mounted on a cable.

FIG. 4 illustrates the electric field control device to of FIG. 3 mounted on a cable 16. The cable 16 may be any high or medium power cable, e.g. cross-linked polyethylene, (XLPE) cable. The electric field control device to may for example be arranged on a shielded power cable, wherein the fields created at the termination of a circumferential conductive shield (also denoted outer semiconducting layer edge, or semicon edge). At this semicon edge, i.e. where the conductive shield is cut off, high electric field and electric field stress are created.

The electric field control device to comprising the chemically bonded field grading adapter 13 and the stress cone 12 (in turn comprising the rubber part 15 and the deflector 14) comprises a single body. The electric field control device to can thereby easily be installed by simply fitting it over the cable ending, and in particular over the outer shield of the stripped cable 16, i.e. over the semicon edge. This is in contrast to the prior art installation, which requires the installation of two separate bodies, the field grading adapter and the stress cone, with the entailing risks thereof as described earlier.

Besides providing an improved robustness in terms of safety, the electric field control device to also enables a faster installation as only one body is to be mounted on the cable end. The installation can also be made safer in that only one body has to be placed and fitted correctly instead of two as in prior art. The risk of misaligning the adapter and the stress cone with respect to each other is also completely eliminated by the present invention providing a single body to be mounted.

The vulcanization process increases the insulation breakdown strength of the interface between the field grading adapter 13 and the stress cone 12. However, there is still a triple point at the onset of the deflector 14, at which three different materials meet. This triple point is encircled in FIG. 4 and indicated at reference numeral 50. A triple point is a point at which three materials with very different physical properties meet. In high voltage devices, triple points are known to be prone to be initiation points for electrical failures. There are two main risks at this triple point, which increase the failure risk both alone and in combination; Firstly, the vulcanization of three materials in one point is difficult and the bond strength in this point is often lower than in the surrounding bulk materials and interfaces. Secondly, in the area including the triple point the insulating rubber part 15 is sandwiched between two materials with much higher electrical conductivity, i.e. between the field grading adapter 13 and the deflector 14. This will concentrate most of the electric field into the insulating rubber part 15, the thinner the insulating rubber part 15, the higher the field will be. This may be a problem at the onset of the deflector 14, where the thickness of the rubber part 15 approaches zero, resulting in great field concentration at this point.

Figure 5:
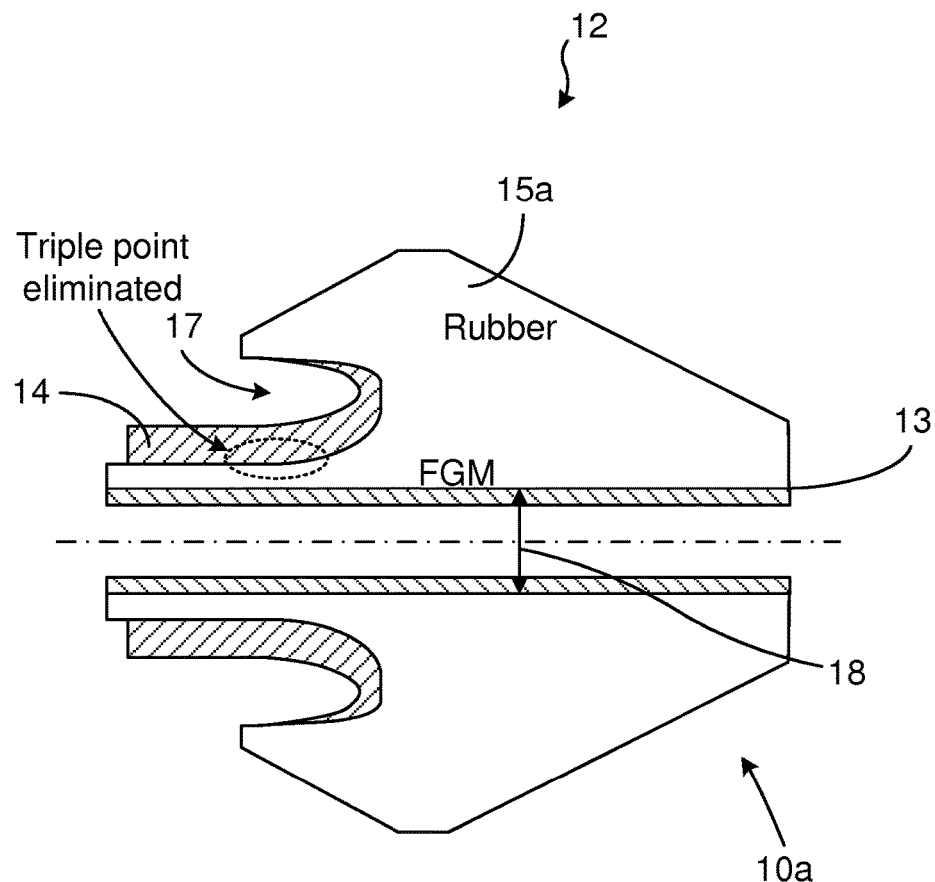
FIG. 5 illustrates another embodiment of an electric field control device according to the present invention.

FIG. 5 illustrates another embodiment of the electric field control device boa according to the present invention. This embodiment addresses and overcomes the above described difficulties of the triple point by a slightly different design of the rubber part 15.

This embodiment of the electric field control device boa differs from the embodiment described with reference to FIG. 3 in that the insulating rubber part 15a is allowed to extend underneath the deflector 14, whereby the triple point indicated in FIG. 4 is eliminated. The deflector 14 is thus, in this embodiment, not in contact with the field grading adapter 13. Firstly, the risks relating to having a triple point in a high electric field is completely avoided. Secondly, since the insulating thickness of the rubber part 15a no longer approaches zero, the field strength can be prevented from reaching dangerous levels.

Figure 6:
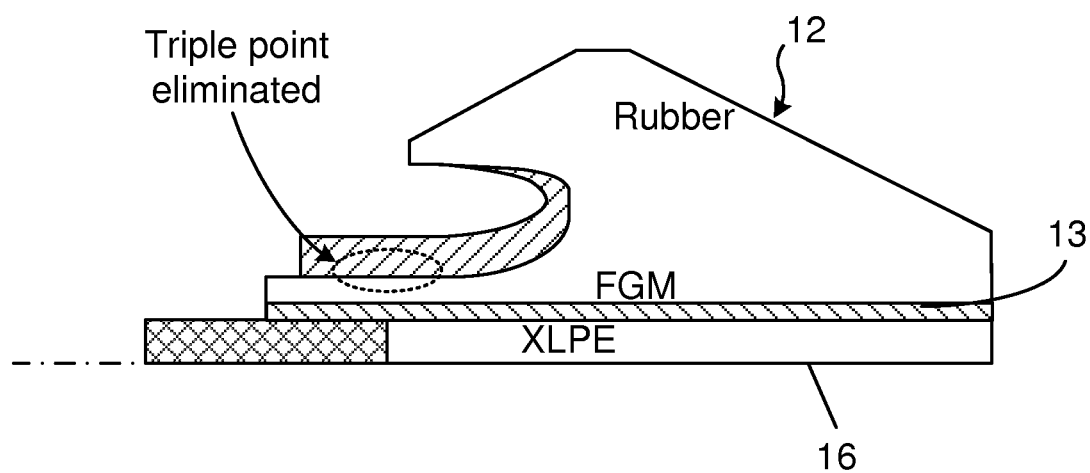
FIG. 6 illustrates an embodiment of an electric field control device according to the present invention mounted on a cable.

FIG. 6 illustrates the electric field control device of FIG. 5 mounted on a cable 16, from which it is again noted that a triple point is avoided.

The various features of the electric field control device 10, boa that have been described can be combined in different ways, examples of which are given in the following.

An electric field control device 10, 10a for a high voltage cable 16 is thus provided. The electric field control device 10, 10a comprises a stress cone 12 and a field grading adapter 13, wherein the stress cone 12 and the field grading adapter 13 are chemically bonded by vulcanization. The stress cone 12 and the field grading adapter 13 are connected by means of the vulcanization or crosslinking, thereby forming a single body.

In an embodiment, the stress cone 12 comprises a deflector 14 and a rubber part 15 vulcanized together.

In an embodiment, the rubber part 15a of the stress cone 12 extends along the length of the field grading adapter 13, such that the field grading adapter 13 is in contact only with the rubber part 15a of the stress cone 12. The field grading adapter 13 may for instance comprise a tubular body with an inner surface and an outer surface and the rubber part 15a of the stress cone 12 may be arranged on the outer surface of the field grading adapter 13 such that the field grading adapter 13 is circumferentially surrounded by the rubber part 15a of the stress cone 12. The deflector 14 of the stress cone 12 is arranged entirely on a surface of the rubber part 15a. In use, e.g. arranged over the semicon edge of the power cable 16, the inner surface of the tubular field grading adapter 13 is in contact with the power cable 16 and the outer surface of the tubular field grading adapter 13 is in contact with only the rubber part 15, i.e. not in contact with the deflector 14. This embodiment eliminates a triple point, as described with reference e.g. to FIG. 5.

In an embodiment, the rubber part 15 has essentially the shape of a truncated cone and comprises a circumferential groove 17 at an end thereof opposite a truncated top part of the rubber part 15, wherein the deflector 14 is arranged along a surface of the circumferential groove 17.

In an embodiment, the deflector 14 is made of semiconducting rubber and the rubber part 15 is made of insulating rubber.

In an embodiment, the field grading adapter 13 is made of a first field grading material and the rubber part 15, 15a is made of a second field grading material.

In variations of the above embodiment, the first field grading material has different electrical properties than the second field grading material. The FGM material of the field grading adapter 13 may for instance be chosen to have a conductivity and/or permittivity different than the conductivity and/or permittivity of the FGM material of the rubber part 15, 15a, e.g. by choosing filler material and concentration of the chosen filler material accordingly, as has been described earlier.

In an aspect, the present invention provides an electric installation comprising a high power cable 16 comprising an electrical conductor circumferentially surrounded by an insulating layer and conductive shield and comprising an electric field control device 10, 10a as described.

Figure 7:
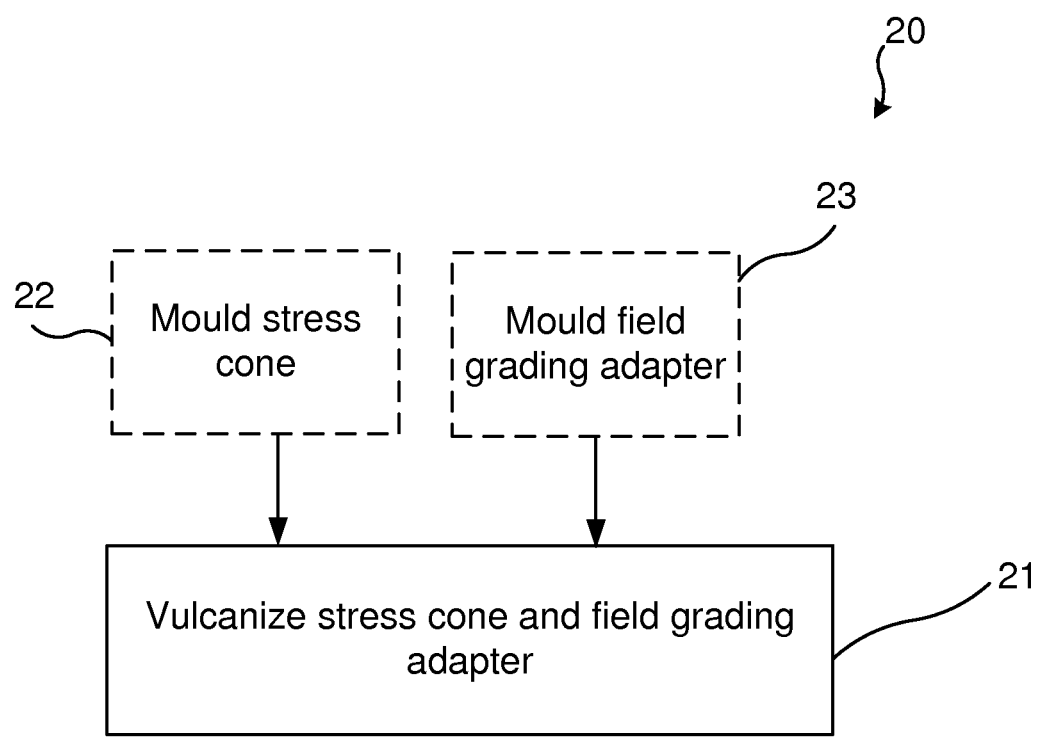
FIG. 7 is a flow chart over a method for manufacturing an electric field control device.

FIG. 7 is a flow chart over a method for manufacturing an electric field control device. In another aspect, thus, the present invention provides a method 20 for manufacturing an electric field control device 10, 10a for a high voltage cable 16. The method 20 comprises vulcanizing 21 together a stress cone 12 and a field grading adapter 13, whereby the stress cone 12 and the field grading adapter 13 are chemically bonded.

The vulcanization process used for vulcanizing together the field grading adapter 13 and the stress cone 12 may for example comprise adding a curative and use high pressure and high temperature, as has been described earlier. Other examples of vulcanization processes that can be used comprise hot air vulcanization and ultraviolet (UV) light vulcanization. The curatives used in the vulcanization process may for example comprise the mentioned sulfur, or peroxides, as has also been mentioned earlier. The vulcanization parameters should be chosen carefully, and may be adapted in view of the material(s) chosen and/or the application at hand. The removal of the physical interface by the vulcanization according to the present invention reduces the effects of internal defects, such as voids, contaminants etc., and thereby increases the electric breakdown strength of the electric field control device 10. Further, the mechanical stability of the materials will increase when they are merged. The vulcanization process increases adhesion between the materials, preventing slipping, and greatly reduces crack propagation along the interface.

In an embodiment, the method 20 comprises, prior to the vulcanizing 21 together the stress cone 12 and the field grading adapter 13, moulding 22 the stress cone 12 and moulding 23 the field grading adapter 13.

In another embodiment, the method 20 comprises, prior to the vulcanizing 21 together the stress cone 12 and the field grading adapter 13, producing the field grading adapter 13 by a taping process comprising wounding a tape made of a field grading material around a cylindrical body. The field grading adapter 13 may then be vulcanized.

In an embodiment, the method 20 comprises, prior to the vulcanizing 21 together the stress cone 12 and the field grading adapter 13, producing the stress cone 12 by a taping process comprising wounding a tape into a body and forming the body into a desired shape of the stress cone 12. The stress cone 12 may for instance be formed into a shape such as the cone-shape that has been described earlier. The forming of the body of tape into a desired shape may be performed for instance by means of cutting or turning (in a lathe). The tape may be made of a material such as rubber or field grading material. The stress cone 12 may then be vulcanized.

The field grading adapter 13 produced by a taping process and the stress cone 12, also produced by a taping process, may then be mounted together and vulcanized into a single body.

Alternatively, the field grading adapter 13 and the stress cone 12 are produced in a single taping process, wherein the field grading adapter 13 is first produced e.g. as described above. The stress cone 12 is next produced by wounding a tape around the field grading adapter 13 into a body, which is then formed into the desired shape of the stress cone 12. The stress cone 12 and the field grading adapter 13 may then be vulcanized together.

It is noted that in still other embodiments, the stress cone 12 may be produced in a different way than the field grading adapter 13. For instance, the stress cone 12 may be produced in a taping process while the field grading adapter 13 is moulded, or vice versa.

In an embodiment, the stress cone 12 comprises a deflector 14 and a rubber part 15, 15a, and the method 20 comprises, prior to the vulcanizing 21 together the stress cone 12 and the field grading adapter 13, vulcanizing together the deflector 14 and the rubber part 15, 15a. The stress cone 12 produced e.g. by the taping process may be provided with a deflector 14 e.g. produced in a taping process, and the stress cone 12 and deflector 14 then be vulcanized together.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. An electric field control device for a high voltage cable, comprising:
    a stress cone, comprising a deflector and a rubber part vulcanized together; and
    a field grading adapter comprising non-linear resistive field grading material,
    wherein there is a chemical bond between the stress cone and the field grading adapter through cross-linked polymer chains obtained by vulcanization,
    wherein the field grading adapter is made of a first field grading material and the rubber part is made of a second field grading material, and
    wherein the first field grading material has different electrical properties than the second field grading material.

2. The electric field control device as claimed in claim 1, wherein the rubber part of the stress cone extends along the length of the field grading adapter, such that the field grading adapter is in contact only with the rubber part of the stress cone.

3. The electric field control device as claimed in claim 1, wherein the rubber part has essentially the shape of a truncated cone and comprises a circumferential groove at an end thereof opposite a truncated top part of the rubber part, and wherein the deflector is arranged circumferentially along a surface of the circumferential groove.

4. The electric field control device as claimed in claim 1, wherein the deflector is made of semiconducting rubber and the rubber part is made of insulating rubber.

5. An electric installation comprising:
    a high power cable comprising an electrical conductor circumferentially surrounded by an insulating layer and conductive shield; and
    the electric field control device as claimed in claim 1.

6. A method for manufacturing the electric field control device for the high voltage cable according to claim 1, comprising the step of:
    vulcanizing together the stress cone and the field grading adapter comprising non-linear field grading material, whereby the stress cone and the field grading adapter are chemically bonded.

7. The method as claimed in claim 6, further comprising the steps of, prior to the step of vulcanizing together the stress cone and the field grading adapter, moulding the stress cone and moulding the field grading adapter.

8. The method as claimed in claim 6, further comprising the step of, prior to the step of vulcanizing together the stress cone and the field grading adapter, producing the field grading adapter by a taping process comprising winding a tape made of a field grading material around a cylindrical body.

9. The method as claimed in claim 6, further comprising the step of, prior to the step of vulcanizing together the stress cone and the field grading adapter, producing the stress cone by a taping process comprising wounding a tape into a body and forming the body into a desired shape of the stress cone.

10. The method as claimed in claim 6, wherein the stress cone comprises a deflector and a rubber part, and wherein the method further comprises the step of, prior to the step of vulcanizing together the stress cone and the field grading adapter, vulcanizing together the deflector and the rubber part.

11. The electric field control device as claimed in claim 2, wherein the rubber part has essentially the shape of a truncated cone and comprises a circumferential groove at an end thereof opposite a truncated top part of the rubber part, wherein the deflector is arranged circumferentially along a surface of the circumferential groove.

12. The electric field control device as claimed in claim 2, wherein the deflector is made of semiconducting rubber and the rubber part is made of insulating rubber.

13. The electric field control device as claimed in claim 3, wherein the deflector is made of semiconducting rubber and the rubber part is made of insulating rubber.

14. An electric installation comprising:
    a high power cable comprising an electrical conductor circumferentially surrounded by an insulating layer and conductive shield; and
    the electric field control device as claimed in claim 2.

* * * * *